(12) United States Patent
Borg (10) Patent No.: US 8,031,247 B2
(45) Date of Patent: Oct. 4, 2011

(54) METHOD AND APPARATUS PROVIDING AN IMAGER WITH A SHARED POWER SUPPLY AND READOUT LINE FOR PIXELS

(75) Inventor: Matthew M. Borg, Albany, OR (US)

(73) Assignee: Aptina Imaging Corporation, George Town (KY)

( * ) Notice: Subject to any disclaimer, the term of this patent is extended or adjusted under 35 U.S.C. 154(b) by 415 days.

(21) Appl. No.: 12/222,951

(22) Filed: Aug. 20, 2008

(65) Prior Publication Data
US 2010/0044763 A1 Feb. 25, 2010

(51) Int. Cl.
*H04N 5/335* (2011.01)
*H01L 31/062* (2006.01)
*H01L 27/00* (2006.01)
(52) U.S. Cl. .................. 348/302; 257/292; 250/208.1
(58) Field of Classification Search .............. 348/302, 348/307–310; 250/208.1, 214; 257/292, 257/443–445
See application file for complete search history.

(56) References Cited

U.S. PATENT DOCUMENTS

| 6,246,042 | B1 | 6/2001 | Szydlowski | |
|---|---|---|---|---|
| 6,423,994 | B1 | 7/2002 | Guidash | |
| 6,552,323 | B2 | 4/2003 | Guidash et al. | |
| 7,436,010 | B2 * | 10/2008 | Mori et al. | 257/292 |
| 7,443,437 | B2 * | 10/2008 | Altice et al. | 348/296 |
| 7,639,298 | B2 * | 12/2009 | Oita et al. | 348/308 |
| 7,667,754 | B2 * | 2/2010 | Koyama | 348/308 |
| 2006/0278811 | A1 | 12/2006 | Kim et al. | |
| 2008/0018634 | A1 * | 1/2008 | Yeo et al. | 345/210 |

FOREIGN PATENT DOCUMENTS

| JP | 02-134081 | 5/1990 |
|---|---|---|
| JP | 02-134082 | 5/1990 |

* cited by examiner

*Primary Examiner* — Trung Diep
(74) *Attorney, Agent, or Firm* — Nancy Y. Ru (57) ABSTRACT

A method and apparatus providing an imager with shared power supply and readout lines. A pixel array has a plurality of pixels arranged in rows and columns. Each column of the array comprises a column line coupled to receive pixel signals from the pixels in the column and selectively operated to provide a supply voltage to at least one pixel in a different column.

34 Claims, 10 Drawing Sheets

METHOD AND APPARATUS PROVIDING AN IMAGER WITH A SHARED POWER SUPPLY AND READOUT LINE FOR PIXELS

FIELD OF THE INVENTION

Embodiments described herein relate generally to imaging devices having pixel arrays with pixels receiving a supply voltage.

BACKGROUND OF THE INVENTION

Many portable electronic devices, such as cameras, cellular telephones, personal digital assistants (PDAs), MP3 players, computers, and other devices include an imaging device for capturing images. One example of an imaging device is a CMOS imaging device. A CMOS imaging device includes a focal plane array of pixels, each one of the pixels including a photosensor, for example, a photogate, photoconductor or a photodiode overlying a substrate for accumulating photo-generated charge in the underlying portion of the substrate. Each pixel has a readout circuit that includes at least an output transistor and a charge storage region connected to the gate of the output transistor. The charge storage region may be constructed as a floating diffusion region. Each pixel may include at least one electronic device such as a transistor for transferring charge from the photosensor to the storage region, one device, also typically a transistor, for resetting the storage region to a predetermined charge level prior to charge transference, and a row select transistor for selectively connecting the pixel to a column line.

In a CMOS imaging device, the active elements of a pixel perform the necessary functions of: (1) photon to charge conversion; (2) accumulation of image charge; (3) resetting the storage region to a known state; (4) transfer of charge to the storage region accompanied by charge amplification; (5) selection of a pixel for readout; and (6) output and amplification of a signal representing a reset level and pixel charge. Photo charge may be amplified when it moves from the initial charge accumulation region to the storage region. The charge at the storage region is typically converted to a pixel output voltage by a source follower output transistor.

In general, CMOS imaging devices require some minimum number of horizontal and vertical lines per pixel for providing control signals, biasing and readout of the pixels. The number of horizontal and vertical lines per pixel running across the pixel array determines the size of the opening over the photosensor and thus, significantly affects fill factor and quantum efficiency.

Figure 1:
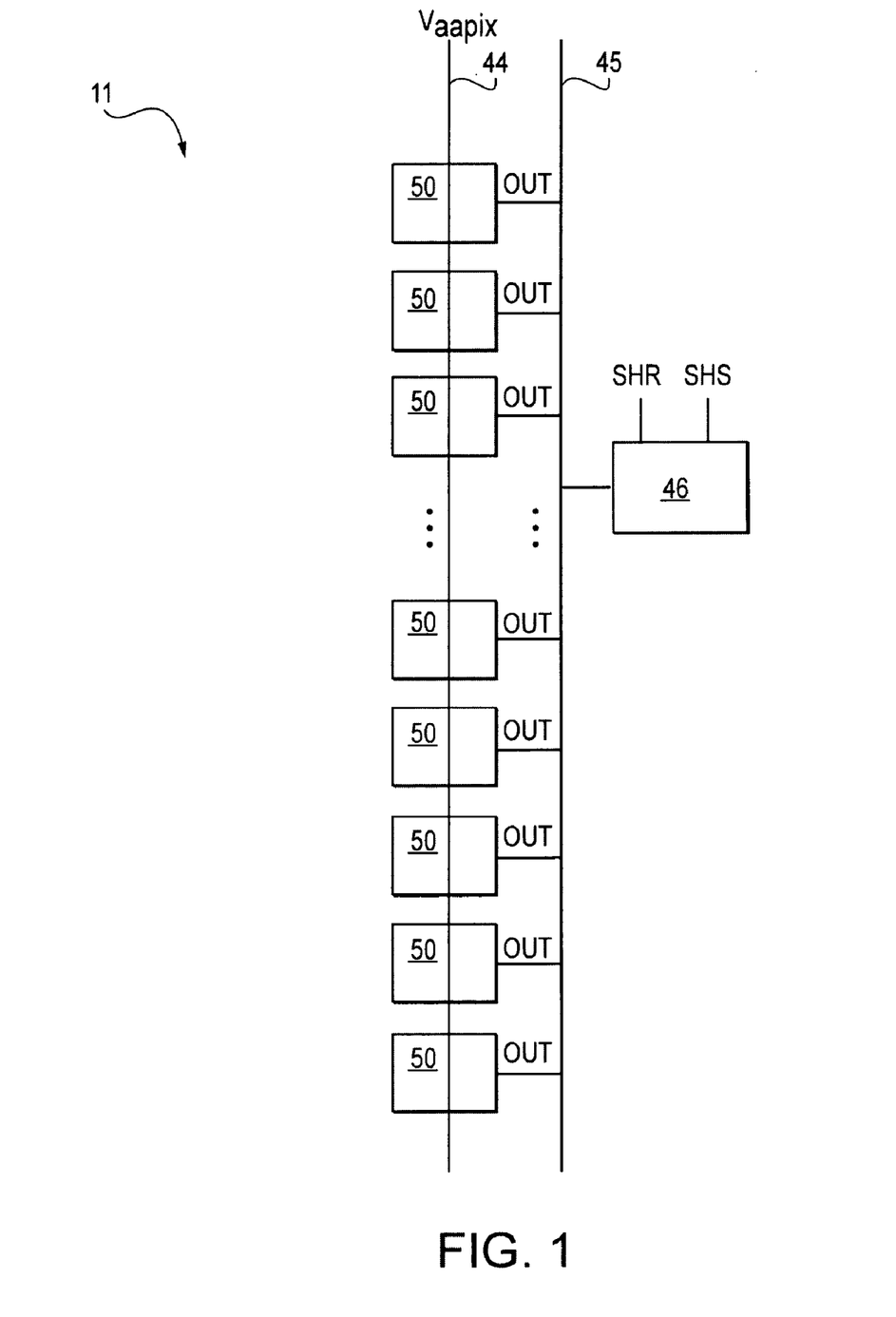
FIG. 1 illustrates a prior art pixel array.

FIG. 1 shows one column of a typical pixel array 11 as is known in the art. The pixel array 11 contains pixels 50 that are coupled to two vertically routed, conductive/metal lines: column line 45 and array pixel voltage supply line 44. A sample and hold circuit 46 is coupled to the column line 45 for receiving and holding output signals from selected pixels, usually pixel row by pixel row.

Figure 2:
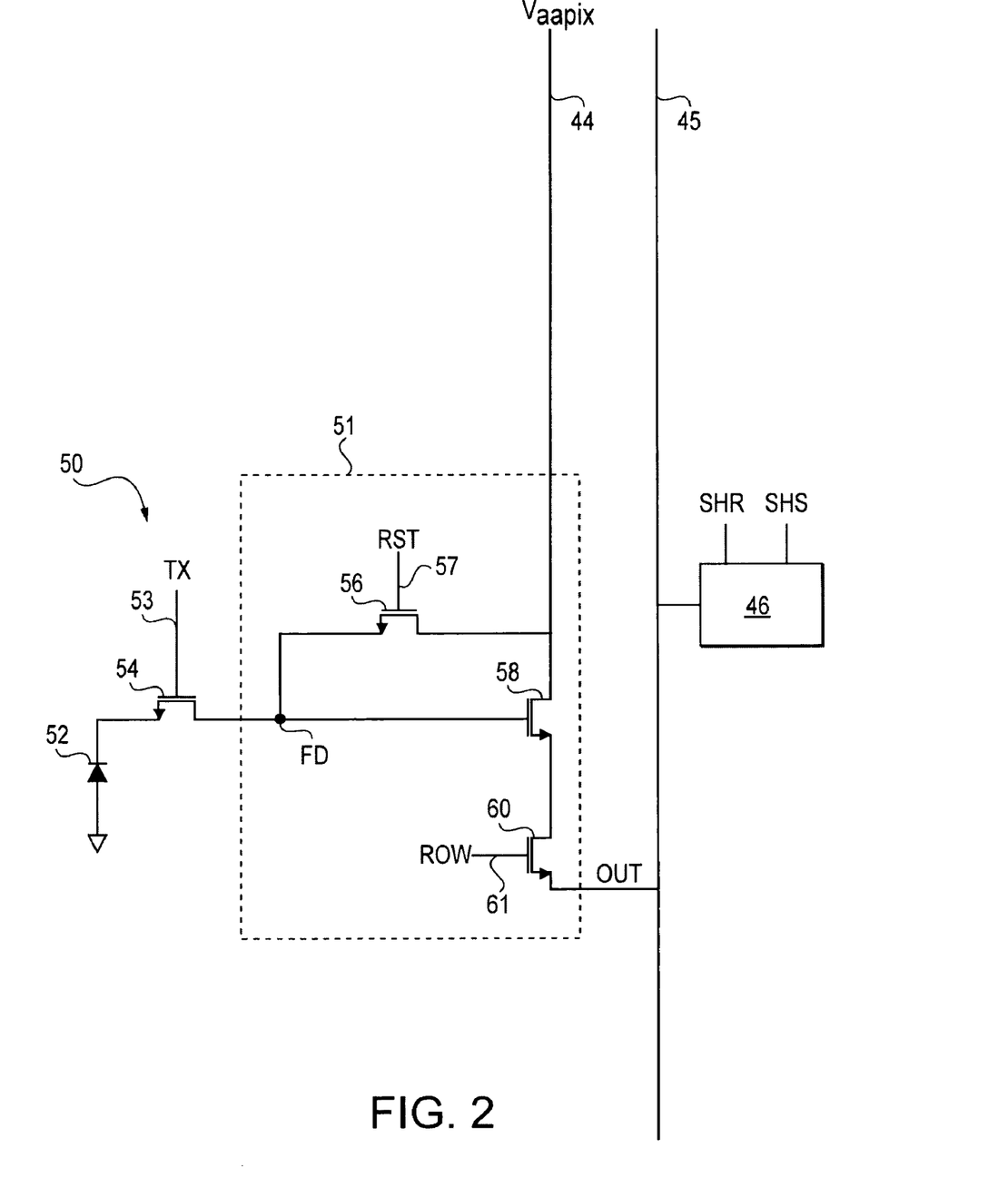
FIG. 2 illustrates a prior art pixel.

FIG. 2 shows the configuration of a typical four transistor pixel 50. The pixel 50 includes a photosensor 52 (e.g., photodiode), transfer transistor 54, and readout circuit 51. The readout circuit 51 includes a storage node configured as a floating diffusion region FD, reset transistor 56, source follower transistor 58 and row select transistor 60. The photosensor 52 is connected to the floating diffusion region FD by the transfer transistor 54 when the transfer transistor 54 is activated when the transfer select line 53 carries a transfer select signal TX. The reset transistor 56 is connected between the floating diffusion region FD and the array pixel voltage supply line 44 supplying the array pixel supply voltage $V_{aapix}$. A reset select signal RST supplied over a reset select line 57 is used to activate the reset transistor 56, which resets the floating diffusion region FD to a known state (e.g., $V_{aapix}$) as is known in the art.

The source follower transistor 58 has its gate connected to the floating diffusion region FD and is connected between the array pixel voltage supply line 44 and the row select transistor 60. The source follower transistor 58 converts the charge stored at the floating diffusion region FD into an electrical output signal. The row select transistor 60 is controllable by a row select signal ROW, supplied over a row select line 61, for selectively outputting the output signal OUT from the source follower transistor 58 to the sample and hold circuit 46 via the column line 45. For each pixel 50, two output signals are conventionally generated, one being a reset signal $V_{rst}$ generated after the floating diffusion region FD is reset, the other being an image or photo signal $V_{sig}$ generated after charges are transferred from the photosensor 52 to the floating diffusion region FD. The reset signal $V_{rst}$ is selectively stored in the sample and hold circuit 46 when the reset sample and hold select signal SHR is pulsed. The pixel signal $V_{sig}$ is selectively stored in the sample and hold circuit 46 when the pixel sample and hold select signal SHS is pulsed. Thus, the pixel 50 has two vertical conductive/metal lines that run through each column of the array: array pixel voltage supply line 44 and column line 45, and three horizontal conductive/metal lines that run through each row of the array: transfer select line 53, reset select line 57 and row select line 61.

To increase fill factor, it is often desirable for pixels to share horizontal and/or vertical lines. One known method of sharing vertical lines is for two or more pixels in different columns to share the same column line. Another known method has pixels in adjacent columns sharing the array pixel voltage supply line. Both of these approaches increase fill factor and quantum efficiency compared to the conventional pixel array 11 shown in FIG. 1. As the total pixel area continues to decrease due to desired scaling, however, it becomes increasingly important to create imaging devices with fewer metal lines running through the pixel array area to further increase quantum efficiency and fill factor.

DETAILED DESCRIPTION OF THE INVENTION

In the following detailed description, reference is made to various embodiments that are described with sufficient detail to enable those skilled in the art to practice them. It is to be understood that other embodiments may be employed, and that various structural, logical and electrical changes may be made. The sequence of processing steps described herein is an example of described embodiments; however, the sequence of steps is not limited to that set forth herein and may be changed as is known in the art, with the exception of steps necessarily occurring in a certain order.

Various embodiments described herein provide reduced metal routing in an imager by using neighboring column lines to supply an array pixel supply voltage. By using the column lines to carry the pixel output signal and the array pixel supply voltage, the number of vertical lines in each pixel is significantly reduced, thus increasing quantum efficiency and fill factor. Various embodiments described herein also share horizontal lines, thus further increasing quantum efficiency and fill factor.

The term "pixel," as used herein, refers to a photo-element unit cell containing at least a photosensor for converting photons to an electrical signal. For purposes of illustration, a small number of representative pixels are illustrated in the figures and description herein; however, typically fabrication of a large plurality of like pixels for an array proceeds simultaneously. Accordingly, the following detailed description is not to be taken in a limiting sense.

Figure 3A:
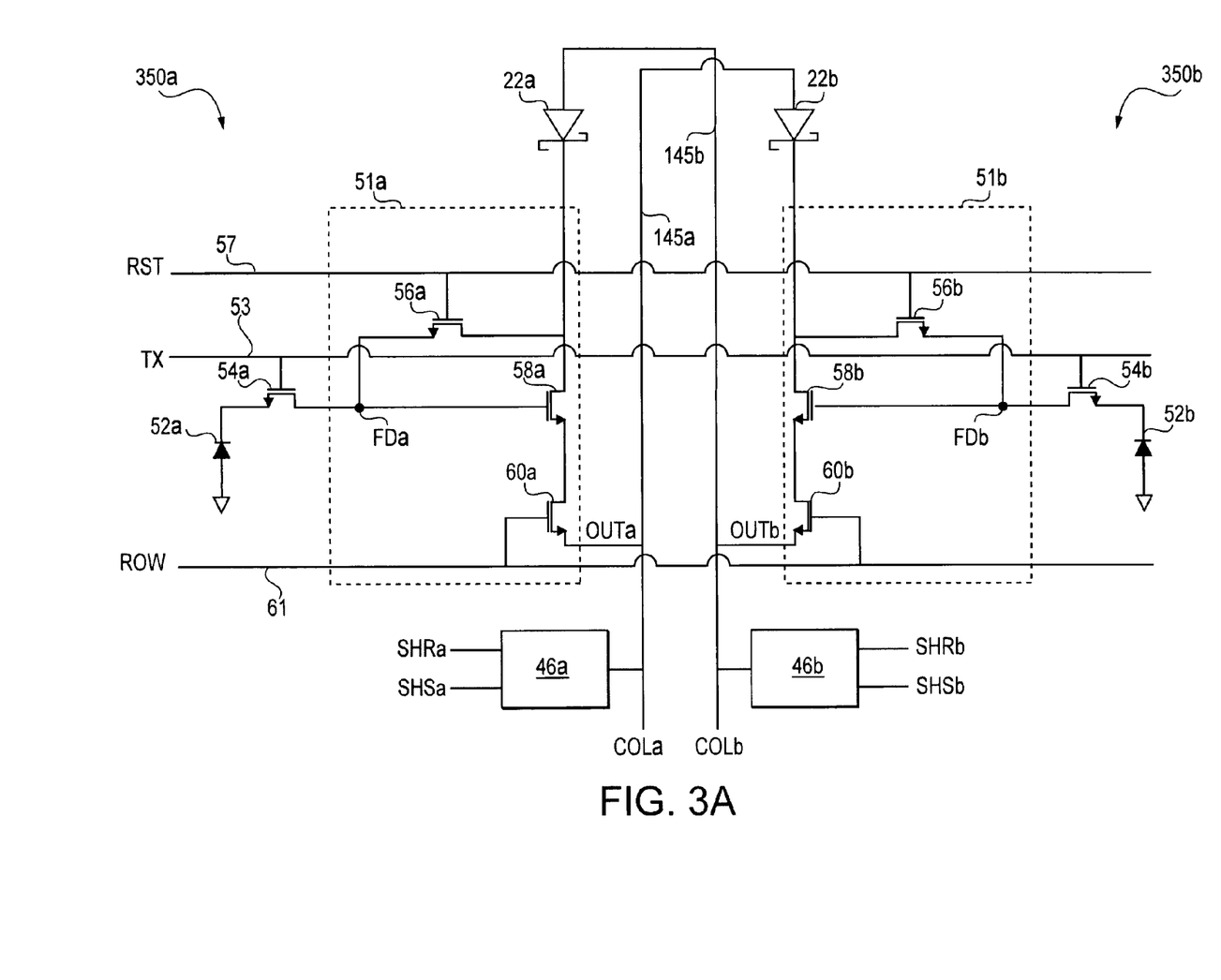
FIG. 3A illustrates a portion of a pixel array according to an embodiment described herein.

FIG. 3A shows two pixels 350a, 350b according to a first embodiment. The pixels 350a, 350b are in the same row and are similar to pixel 50 (FIG. 2) except that the pixels 350a, 350b receive the array pixel supply voltage $V_{aapix}$ from an adjacent column line 145b, 145a, respectively, and not from a dedicated array pixel voltage supply line 44 (FIGS. 1, 2). Blocking circuitry 22a, 22b couples each column line 145b, 145a to the adjacent pixel 350a, 350b to prevent current from flowing back through an inactive source follower transistor 58a, 58b onto the column line 145b, 145a. The blocking circuitry 22a, 22b may be, e.g., Schottky diodes.

Pixel 350a includes photosensor 52a, transfer transistor 54a, and readout circuit 51a. Readout circuit 51a includes floating diffusion region FDa, reset transistor 56a, source follower transistor 58a and row select transistor 60a. Photosensor 52a is connected to floating diffusion region FDa by transfer transistor 54a when the transfer transistor 54a is activated by the transfer select line 53 carrying a transfer select signal TX. Blocking circuit (e.g., Schottky diode) 22a couples column line 145b to reset transistor 56a and the drain of source follower transistor 58a. Reset transistor 56a is connected between floating diffusion region FDa and blocking circuit 22a. A reset select signal RST supplied over a reset select line 57 is used to activate reset transistor 56a, which resets floating diffusion region FDa to a known state as is known in the art.

Source follower transistor 58a has a gate connected to floating diffusion region FDa and is connected between blocking circuit 22a and row select transistor 60a. Source follower transistor 58a converts the charge stored at floating diffusion region FDa into an electrical output signal. Row select transistor 60a is controllable by a row select signal ROW supplied over a row select line 61 for selectively outputting output signal OUTa from source follower transistor 58a to sample and hold circuit 46a via column line 145a. Column line 145b supplies column signal COLb to blocking circuit 22a. In pixel 350a, and for all pixels in the illustrated embodiment, two output signals are generated, one being a reset signal $V_{rst}$ generated after floating diffusion region FDa is reset, the other being an image or photo signal $V_{sig}$ generated after charges are transferred from photosensor 52a to floating diffusion region FDa. The output signals $V_{rst}$, $V_{sig}$ are selectively stored in sample and hold circuit 46a in response to reset and pixel sample and hold select signals SHRa, SHSa as described above.

Pixel 350b includes photosensor 52b, transfer transistor 54b, and readout circuit 51b. Readout circuit 51b includes floating diffusion region FDb, reset transistor 56b, source follower transistor 58b and row select transistor 60b. Photosensor 52b is connected to floating diffusion region FDb by transfer transistor 54b when the transfer transistor 54b is activated by the transfer select line 53 carrying a transfer select signal TX. Blocking circuit (e.g., Schottky diode) 22b couples column line 145a to reset transistor 56b and the drain of source follower transistor 58b. Reset transistor 56b is connected between floating diffusion region FDb and blocking circuit 22b. A reset select signal RST supplied over a reset select line 57 is used to activate reset transistor 56b, which resets floating diffusion region FDb to a known state as is known in the art.

Source follower transistor 58b has a gate connected to floating diffusion region FDb and is connected between blocking circuit 22b and row select transistor 60b. Source follower transistor 58b converts the charge stored at floating diffusion region FDb into an electrical output signal. Row select transistor 60b is controllable by a row select signal ROW supplied over a row select line 61 for selectively outputting output signal OUTb from source follower transistor 58b to sample and hold circuit 46b via column line 145b. Column line 145a supplies column signal COLa to blocking circuit 22b. In pixel 350b, and for all pixels in the illustrated embodiment, two output signals are generated, one being a reset signal $V_{rst}$ generated after floating diffusion region FDb is reset, the other being an image or photo signal $V_{sig}$ generated after charges are transferred from photosensor 52b to floating diffusion region FDb. The output signals $V_{rst}$, $V_{sig}$ are selectively stored in sample and hold circuit 46b in response to reset and pixel sample and hold select signals SHRb, SHSb as described above.

Column signal COLa may be selectively set to an array pixel supply voltage $V_{aapix}$ such that column line 145a supplies an array pixel supply voltage $V_{aapix}$ to pixel 350b. Column signal COLb may be selectively set to the array pixel supply voltage $V_{aapix}$ such that column line 145b supplies an array pixel supply voltage $V_{aapix}$ to pixel 350a.

Figure 3B:
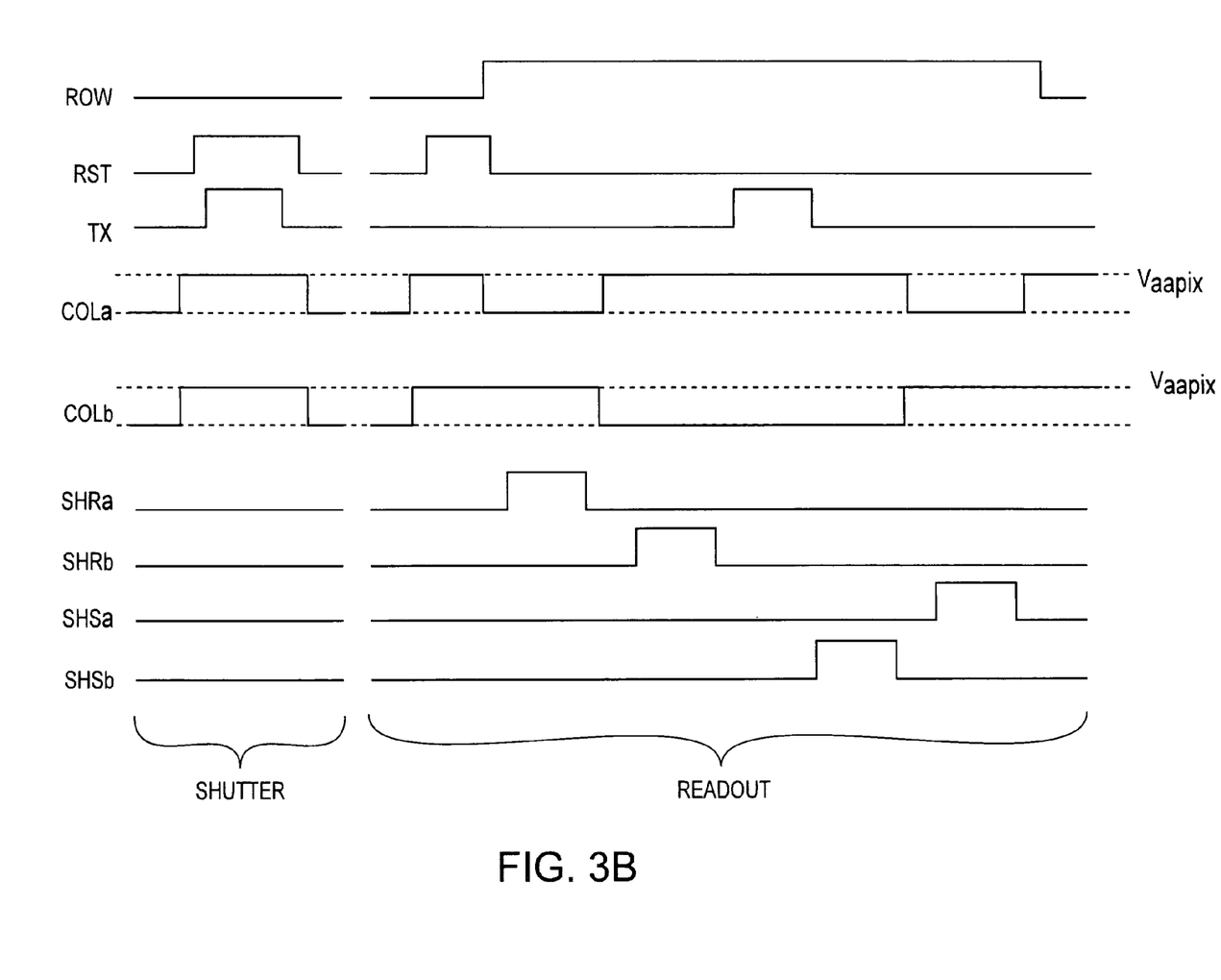
FIG. 3B is a timing diagram illustrating a method for operating a pixel array according to an embodiment described herein.

FIG. 3B shows one of many possible timing diagrams for operating the pixels 350a, 350b of FIG. 3A. At the beginning of a shutter period, the reset select signal RST and transfer select signal TX are activated (e.g., set to a positive voltage level), while the column signals COLa, COLb carry the array pixel supply voltage $V_{aapix}$ through the blocking circuits 22a, 22b to the reset transistors 56a, 56b and transfer transistors 54a, 54b to reset the photosensors 52a, 52b for the next integration period.

During a readout period, the column signals COLa, COLb are again brought to the array pixel supply voltage $V_{aappix}$ and the reset select signal RST is activated, allowing the array pixel supply voltage $V_{aapix}$ to be stored at the floating diffusion regions FDa, FDb. Column signal COLa is deactivated (e.g., released from $V_{aapix}$) and the row select signal ROW and reset sample and hold signal SHRa are activated to allow readout of the reset signal $V_{rst}$ from floating diffusion region FDa to sample and hold circuit 46a. Column signal COLb is deactivated, column signal COLa is increased to the array pixel supply voltage $V_{aapix}$ and reset sample and hold signal SHRb is activated to allow readout of the reset signal $V_{rst}$ from floating diffusion region FDb to sample and hold circuit 46b. The transfer select signal TX is thereafter activated to allow transfer of the integrated photocharge from the photosensors 52a, 52b to the floating diffusion regions FDa, FDb, respectively. Pixel sample and hold signal SHSb is activated while COLb is deactivated to allow readout of the photo signal $V_{sig}$ from floating diffusion region FDb to sample and hold circuit 46b. Column signal COLa is then deactivated, column signal COLb is increased to the array pixel supply voltage $V_{aapix}$ and pixel sample and hold signal SHSa is activated to allow readout of the photo signal $V_{sig}$ from floating diffusion region FDa to sample and hold circuit 46a.

Figure 4A:
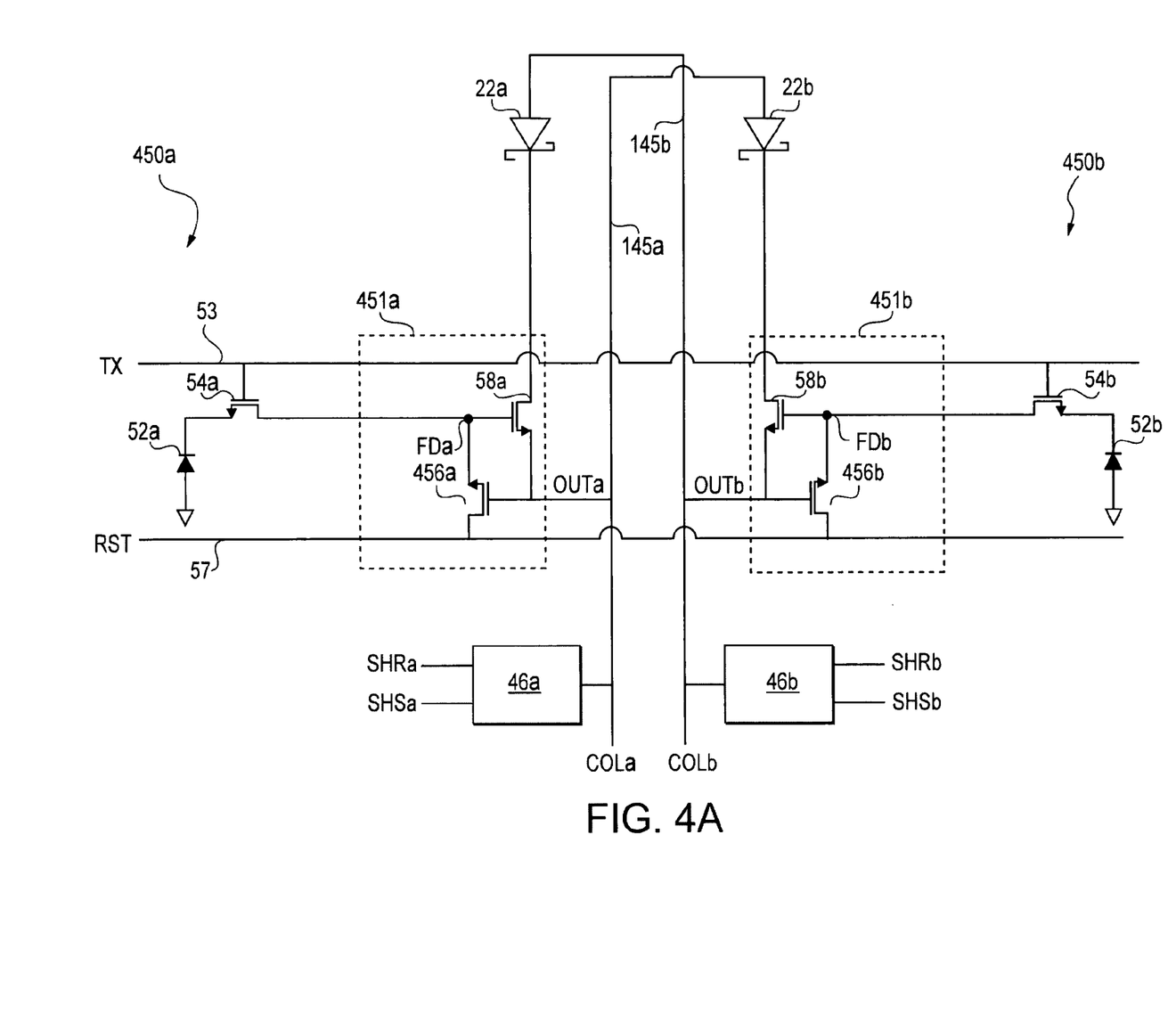
FIG. 4A illustrates a portion of a pixel array according to an embodiment described herein.

FIG. 4A shows two pixels 450a, 450b according to a second embodiment. Pixels 450a, 450b have readout circuits 451a, 451b that do not have row select transistors, thus requiring one less horizontal line than pixels 350a, 350b (FIG. 3A) and further increasing fill factor and quantum efficiency.

Readout circuit 451a of pixel 450a includes floating diffusion region FDa, source follower transistor 58a and reset transistor 456a. Reset transistor 456a is connected between the reset select line 57 and floating diffusion region FDa, and has a gate coupled to column line 145a and the source of source follower transistor 58a. Column signal COLa supplied over column line 145a is used to activate reset transistor 56a, which uses the voltage from the reset select line 57 to reset floating diffusion region FDa to a known state as is known in the art. Source follower transistor 58a has a gate connected to floating diffusion region FDa and the source of reset transistor 456a, and is connected between blocking circuit (e.g., Schottky diode) 22a and the column line 145a.

Readout circuit 451b of pixel 450b includes floating diffusion region FDb, source follower transistor 58b and reset transistor 456b. Reset transistor 456b is connected between the reset select line 57 and floating diffusion region FDb, and has a gate coupled to column line 145b and the source of source follower transistor 58ba. Column signal COLb supplied over column line 145b is used to activate reset transistor 56b, which uses the voltage from the reset select line 57 to reset floating diffusion region FDb to a known state as is known in the art. Source follower transistor 58b has a gate connected to floating diffusion region FDb and the source of reset transistor 456b, and is connected between blocking circuit (e.g., Schottky diode) 22b and the column line 145b.

Figure 4B:
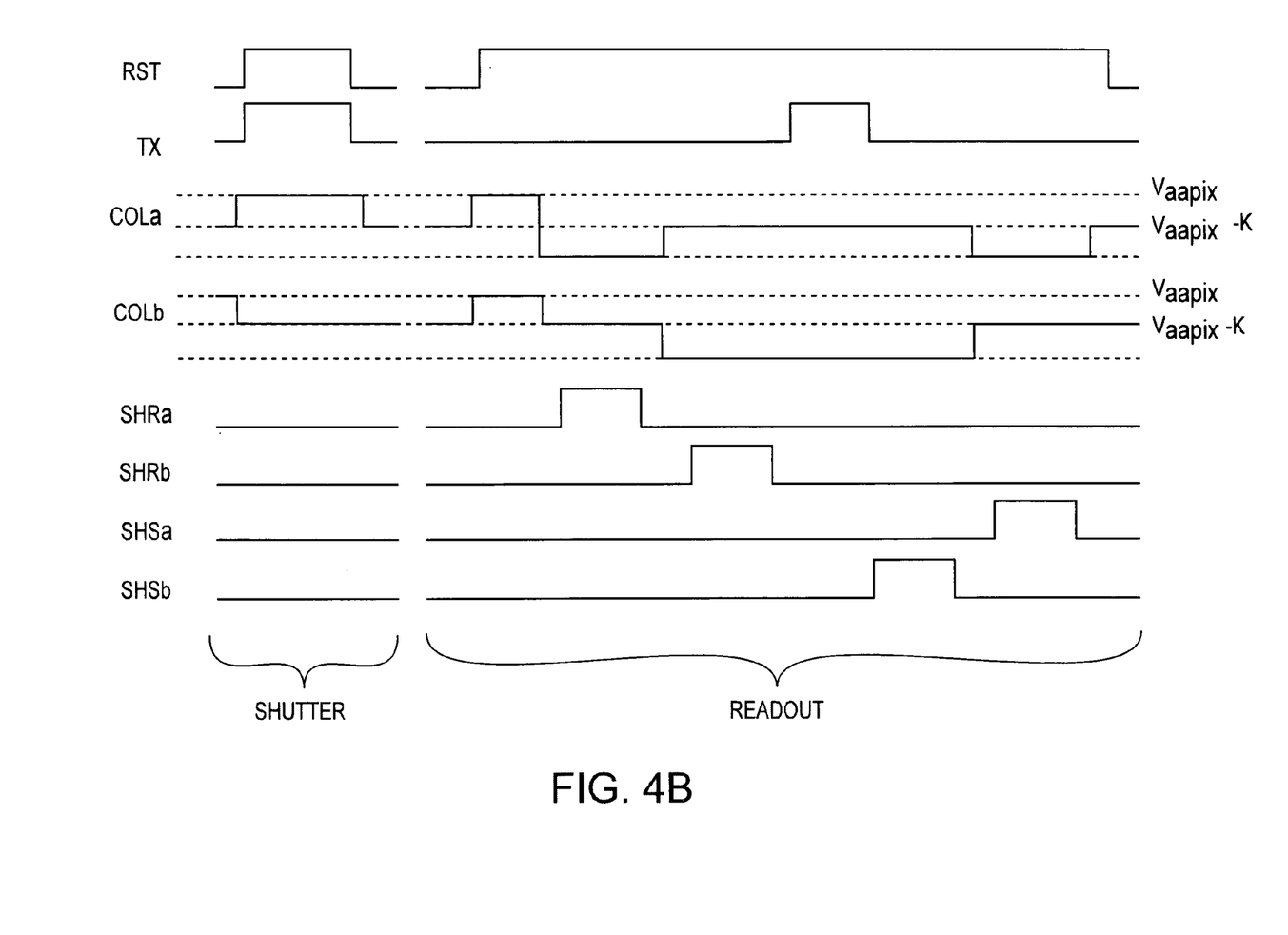
FIG. 4B is a timing diagram illustrating a method for operating a pixel array according to an embodiment described herein.

FIG. 4B shows one of many possible timing diagrams for operating the pixels 450a, 450b of FIG. 4A. At the beginning of a shutter period, the reset select signal RST and transfer select signal TX are activated, and the column lines 145a, 145b are brought to the highest of three possible voltages such that column signals COLa, COLb carry a voltage equal to the array pixel supply voltage $V_{aapix}$ that activates the reset transistors 456a, 456b, allowing the reset transistors 456a, 456b to transfer the $V_{aapix}$ supplied in the reset select signal RST to reset the photosensors 52a, 52b.

During a readout period, the column signals COLa, COLb and the reset select signal RST are brought to the array pixel supply voltage $V_{aapix}$, allowing the array pixel supply voltage $V_{aapix}$ to be transferred from the reset select line 57 (FIG. 4A) to the floating diffusion regions FDa, FDb. The voltage subsequently held by the floating diffusion regions FDa and FDb may be the array pixel supply voltage minus a reset transistor threshold voltage from reset transistors 456a and 456b, respectively. Column signal COLa is then deactivated, column signal COLb is reduced to an intermediate voltage $V_{aapix}$-k, where k is on the order of hundreds of millivolts, and reset sample and hold signal SHRa is activated to allow readout of the reset signal $V_{rst}$ from floating diffusion region FDa to sample and hold circuit 46a. Column signal COLb is reduced to an intermediate voltage $V_{aapix}$-k during readout of pixel 450a because keeping column signal COLb at $V_{aapix}$ may allow reset transistor 456b to change the voltage at floating diffusion region FDb before the reset signal Vrst is read out from pixel 450b. The intermediate voltage $V_{aapix}$-k is high enough, however, that sufficient voltage is supplied to the drain of source follower transistor 58a to allow proper readout of pixel 450a.

Column signal COLb is then deactivated, column signal COLa is increased to intermediate voltage $V_{aapix}$-k and reset sample and hold signal SHRb is activated to allow readout of the reset signal $V_{rst}$ from floating diffusion region FDb to sample and hold circuit 46b. The transfer select signal TX is activated to allow transfer of the integrated photocharge from photosensors 52a, 52b to floating diffusion regions FDa, FDb. Pixel sample and hold signal SHSb is then activated to allow readout of the photo signal $V_{sig}$ from floating diffusion region FDb to sample and hold circuit 46b. Column signal COLa is then deactivated, column signal COLb is increased to the intermediate voltage $V_{aapix}$-k and pixel sample and hold signal SHSa is activated to allow readout of the photo signal $V_{sig}$ from floating diffusion region FDa to sample and hold circuit 46a.

Figure 5:
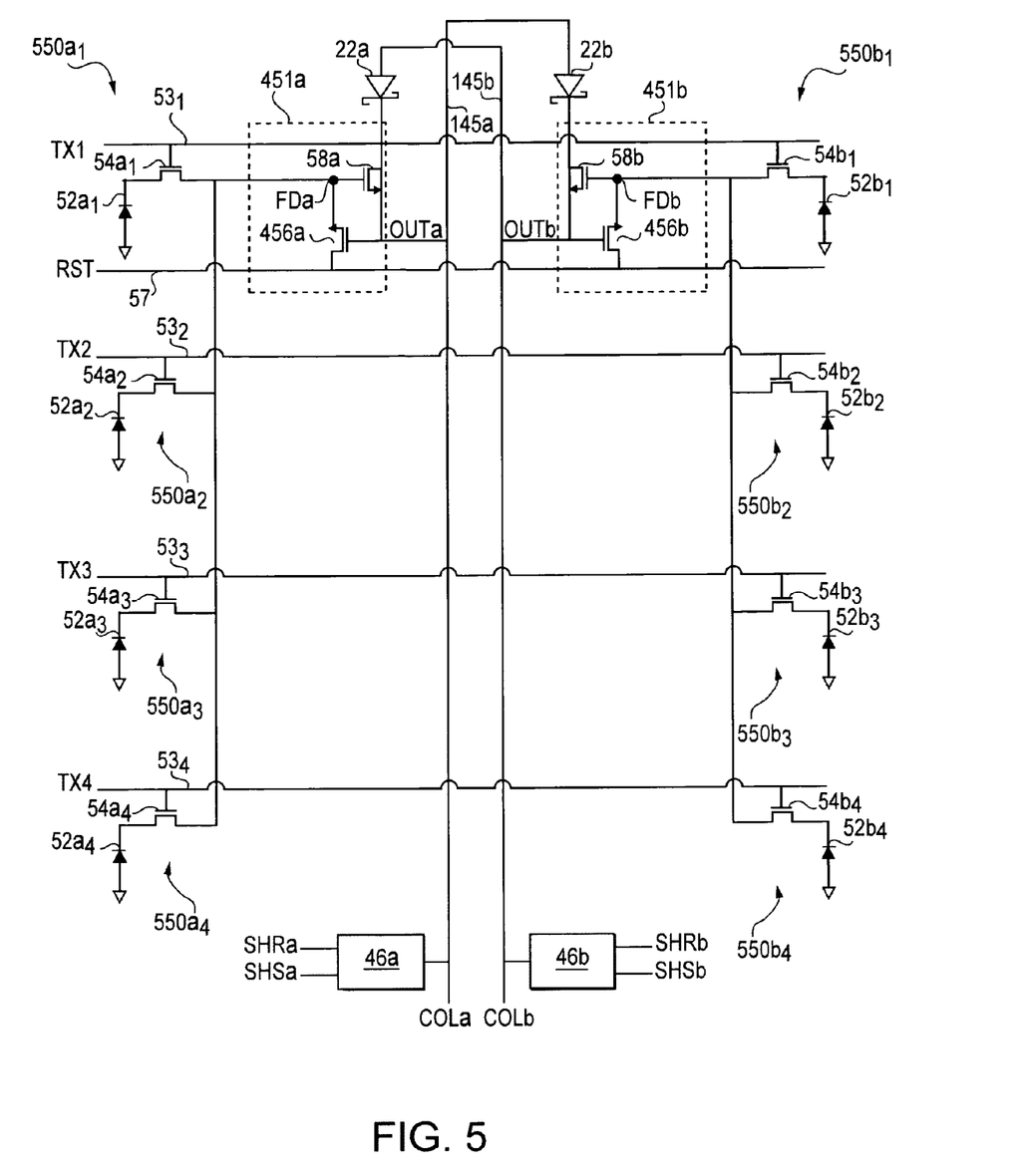
FIG. 5 illustrates a portion of a pixel array according to an embodiment described herein.

FIG. 5 shows an embodiment that further improves fill factor and quantum efficiency by sharing each readout circuit among four pixels. While FIG. 5 couples four pixels to each readout circuit, it is to be understood that more (e.g., six) or less (e.g., two) pixels can be coupled to each readout circuit. Because four pixels share one readout circuit, only one reset control line 57 is needed for four rows, thus significantly decreasing the number of horizontal metal lines.

Readout circuit 451a, configured as described with respect to FIG. 4A, is coupled to receive photosignals from pixels $550a_1$, $550a_2$, $550a_3$ and $550a_4$. Readout circuit 451b, configured as described with respect to FIG. 4A, is coupled to receive photosignals from pixels $550b_1$, $550b_2$, $550b_3$ and $550b_4$. Pixels $550a_1$, $550a_2$, $550a_3$, $550a_4$, $550b_1$, $550b_2$, $550b_3$ and $550b_4$ can be operated as shown for pixels 450a, 450b in FIG. 4B, except that each readout operation must be quadrupled to account for each readout circuit 451a, 451b reading out four pixels.

Embodiments described herein illustrate pairs of pixels receiving signals from each other's column lines, but the present embodiments are to be understood to include pixels that each receives signals (e.g., $V_{aapix}$) from a column line to its left, or its right (i.e., a tandem connection).

Figure 6:
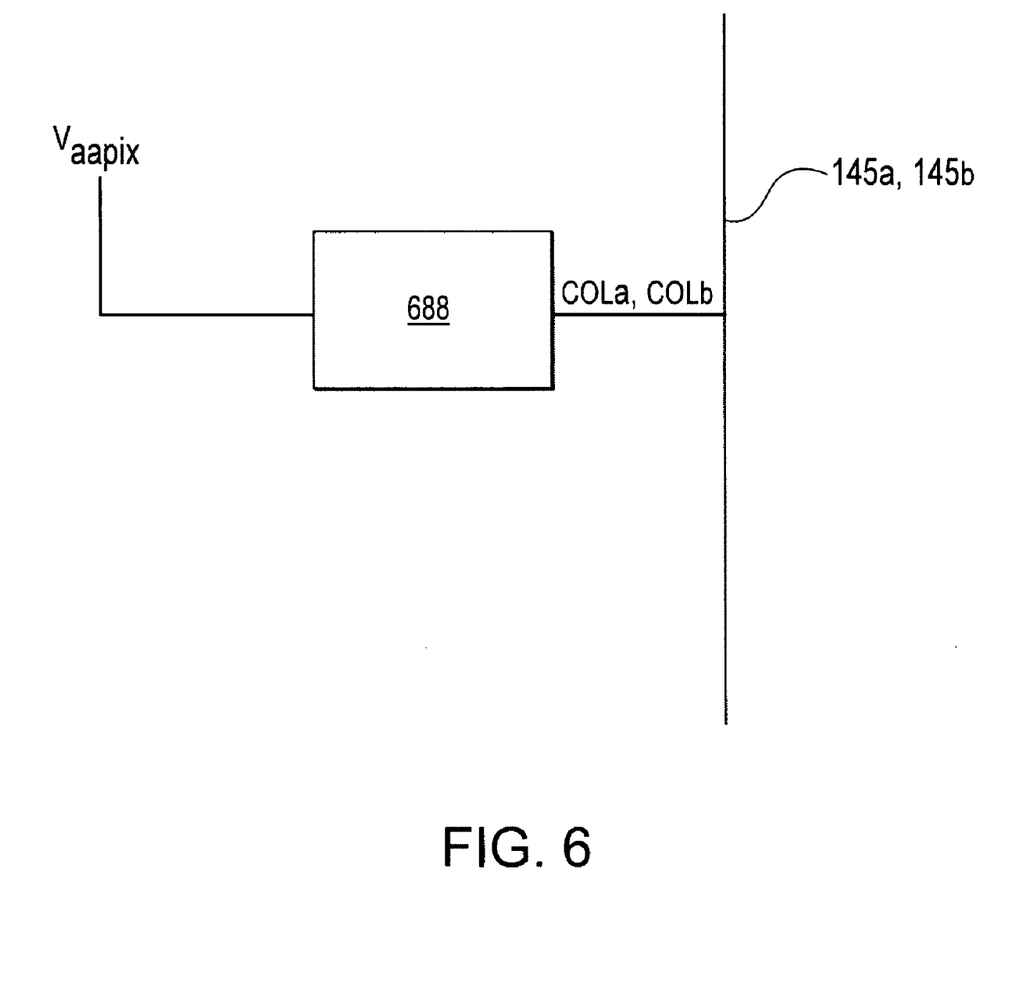
FIG. 6 illustrates a portion of a pixel array according to an embodiment described herein.

FIG. 6 shows a column signal generation circuit 688 for supplying column signals (e.g., COLa, COLb) to the column lines (e.g., 145a, 145b). The column signal generation circuit 688 can be any available circuit known in the art for biasing column lines (e.g., latch up circuitry). The column signal generation circuit 688 receives a voltage (e.g., $V_{aapix}$), and selectively supplies the voltage $V_{aapix}$ to the column line 145a, 145b as the column signal COLa, COLb.

Figure 7:
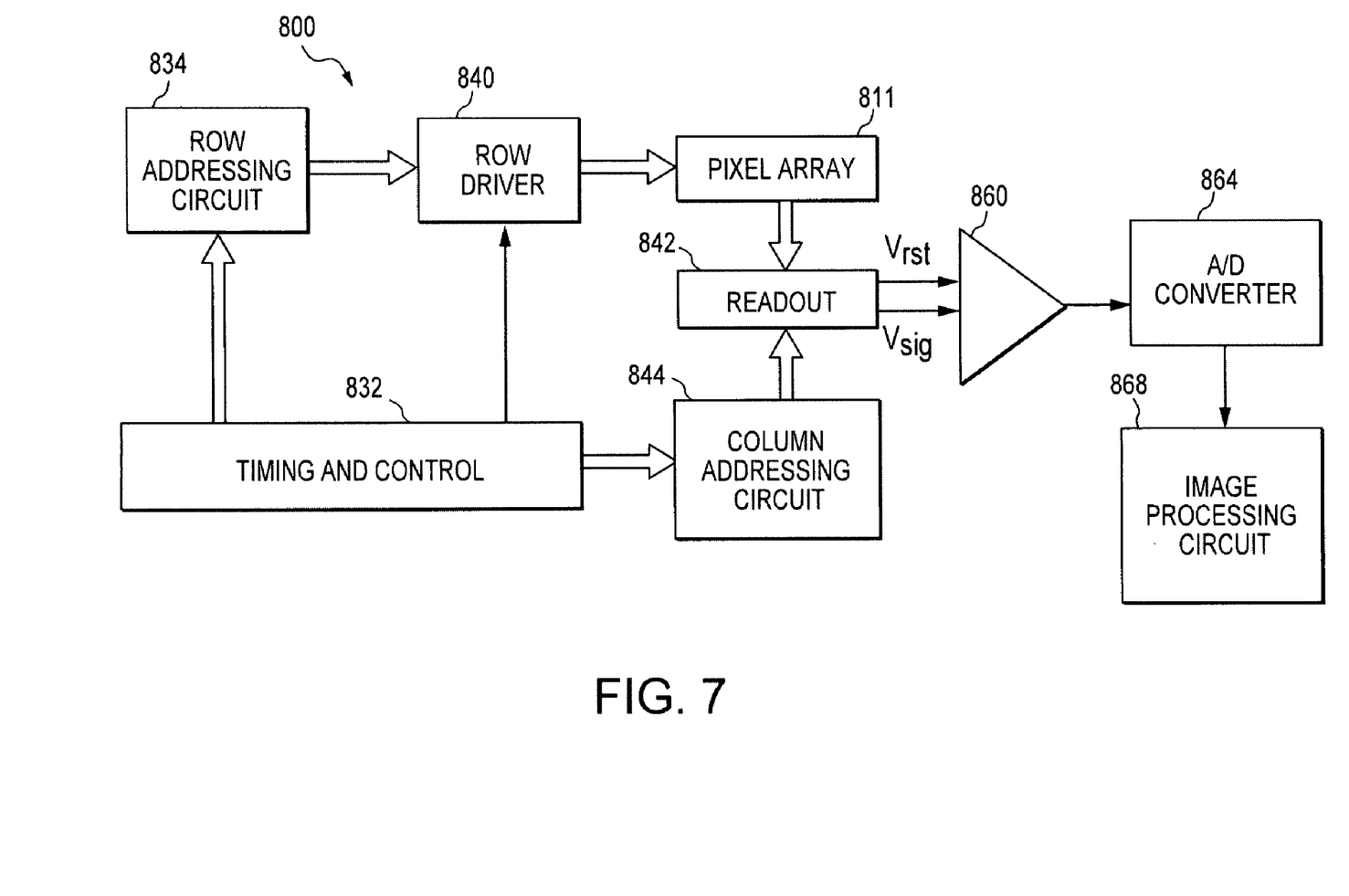
FIG. 7 is a block diagram of an imaging device according to an embodiment described herein.

FIG. 7 illustrates a block diagram example of a CMOS imager 800 having a pixel array 811 constructed in accordance with any of the embodiments and modified embodiments described above. The pixel array 811 comprises a plurality of pixels constructed according to the embodiments illustrated in FIGS. 3A-5, arranged in a predetermined number of columns and rows. A minimum number of horizontal and vertical metal/conductive routing lines are provided for the entire array 811. The horizontal lines are selectively activated by a row driver 840 in response to a row address circuit 834. The vertical lines are selectively activated by a column addressing circuit 844. Thus, a row and column address is provided for each pixel. The row addressing circuit 834 and column addressing circuit 844 are controlled by the timing and control circuit 832. The pixel signals $V_{rst}$, $V_{sig}$ read out from each pixel are subtracted in the differential amplifier 860 and are converted to digital signals by the analog-to-digital converter 864 that supplies the digital signal to an image processing circuit that processes each pixel signal and forms an image that can be displayed, stored, or output.

Figure 8:
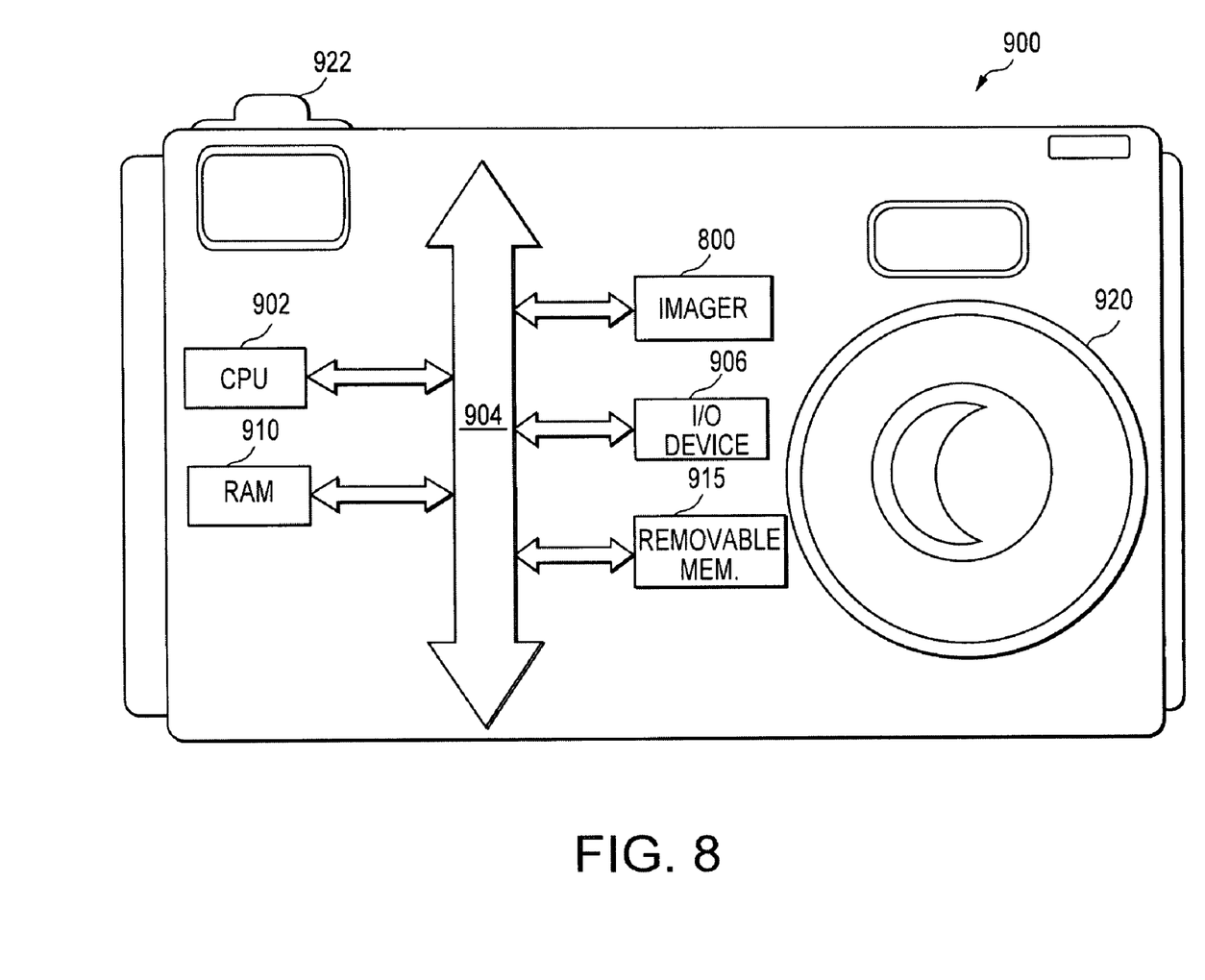
FIG. 8 is a block diagram of a processor system according to an embodiment described herein.

FIG. 8 shows a typical imaging system 900 modified to include an imager 800 constructed and operated in accordance with an embodiment described above. The system 900 is a system having digital circuits that could include imaging devices. Without being limiting, such a system could include a computer system, camera system, scanner, machine vision, vehicle navigation, video telephone, surveillance system, automatic focus system, star tracker system, motion detection system, image stabilization system, or other image acquisition system.

The system 900, for example a digital still or video camera system, generally comprises a processor such as a central processing unit (CPU) 902, such as a control circuit or microprocessor for conducting camera functions, that communicates with one or more input/output (I/O) devices 906 over a bus 904. The imaging device 800 also communicates with the CPU 902 over the bus 904. The system 900 also includes random access memory (RAM) 910, and can include removable memory 915, such as flash memory, which also communicates with the CPU 902 over the bus 904. The imaging device 800 may be combined with the processor with or without memory storage on a single integrated circuit or on a different chip than the processor. In a camera system, a lens 920 is used to focus light onto the pixel array 830 (FIG. 7) of the imaging device 800 when a shutter release button 922 is pressed.

The above description and drawings are only to be considered illustrative of specific embodiments, which achieve the features and advantages described herein. Modification and substitutions to specific structures can be made. Accordingly, the claimed invention is not to be considered as being limited by the foregoing description and drawings, but is only limited by the scope of the appended claims.

What is claimed as new and desired to be protected by Letters Patent of the United States is:

1. An imaging device comprising: a pixel array having a plurality of pixels arranged in rows and columns, a first column of the array comprising an associated first column line arranged to receive pixel signals from the pixels in the first column and further arranged to provide a supply voltage to at least one pixel in a second column of the array, wherein the second column has an associated second column line that provides the supply voltage to at least one pixel in the first column.

2. The imaging device of claim 1, wherein the first column is adjacent to the second column.

3. The imaging device of claim 1, further comprising: a blocking circuit coupling the second column line to at least one pixel coupled to the first column line.

4. The imaging device of claim 3, wherein the blocking circuit is a Schottky diode.

5. The imaging device of claim 1, further comprising a pixel readout circuit for supplying signals from at least one pixel in the first column to the associated first column line, the pixel readout circuit comprising: a storage node for storing photogenerated charge; a charge conversion circuit responsive to the charge at the storage node for supplying a signal to the associated first column line, the charge conversion circuit receiving the supply voltage from second column line; and a reset circuit for selectively resetting the storage node.

6. The imaging device of claim 5, wherein each readout circuit is arranged to receive photogenerated charge from a plurality of pixels.

7. The imaging device of claim 6, wherein the plurality of pixels is in the first column.

8. The imaging device of claim 5, further comprising:
a row select circuit for selectively transferring the output signals from the charge conversion circuit to the associated first column line.

9. The imaging device of claim 5, wherein the associated first column line is arranged to control the reset circuit.

10. An imaging device comprising: a pixel array having a plurality of pixels arranged in rows and columns, each pixel of the array comprising a photosensor; and a plurality of pixel readout circuits arranged in columns, the columns corresponding to columns of pixels, each readout circuit being associated with at least one pixel, said pixel readout circuit comprising: a storage node for receiving charge from at least one pixel;
a charge conversion output circuit responsive to the charge at the storage node for supplying an output signal to an associated column line and for receiving operative power from a different column line, wherein the different column line is configured to receive an output signal from a readout circuit in a different column; and a reset circuit for selectively resetting the storage node.

11. The imaging device of claim 10, further comprising:
a blocking circuit coupled to the readout circuit, the blocking circuit arranged to prevent the transfer of current from the charge conversion circuit to the different column line.

12. The imaging device of claim 11, wherein the blocking circuit is a Schottky diode.

13. The imaging device of claim 10, wherein each pixel readout circuit is configured to receive charge from a plurality of pixels.

14. The imaging device of claim 13, wherein the plurality of pixels is coupled to the associated column line.

15. The imaging device of claim 10, wherein the different column line is to the left of the associated column line.

16. The imaging device of claim 10, wherein the different column line is to the right of the associated column line.

17. The imaging device of claim 10, wherein the associated column line provides operative power to pixels arranged to transfer photosignals to the different column line.

18. The imaging device of claim 10, further comprising:
a row select circuit for selectively transferring the output signals from the charge conversion circuit to the associated column line.

19. The imaging device of claim 10, wherein the associated column line is arranged to control the reset circuit.

20. A digital camera comprising an imaging device, the imaging device comprising a pixel array, the pixel array comprising: a plurality of pixels arranged in rows and columns; and a plurality of vertical supply routing lines arranged such that each vertical supply routing line receives a pixel output signal from a first column of the plurality of pixels and selectively supplies a voltage to a second column of the plurality of pixels, wherein each vertical supply routing line selectively supplies a reset voltage used to reset the second column of the plurality of pixels.

21. The digital camera of claim 20, wherein each vertical supply routing line activates a plurality of pixel reset circuits for providing a reset voltage to reset the first column of the plurality of pixels.

22. The digital camera of claim 21, wherein a second voltage on the vertical supply routing lines used to activate the plurality of pixels reset circuits is higher than the voltage used as a pixel output signal.

23. An imaging device comprising: a pixel array having a plurality of pixels arranged in rows and columns; and a plurality of column lines, wherein a pixel of the array comprises: at least one photosensor; a storage region for storing charge generated by the at least one photosensor; an output transistor having a gate coupled to said storage region for providing an output signal to an associated column line of the plurality of column lines; a reset transistor for resetting said storage region; and     a circuit for supplying operative power to said pixel from a column line of the plurality of column lines, wherein the different column line is configured to receive an output signal from an output transistor in a different column.

24. The imaging device of claim 23, wherein the circuit for supplying operative power comprises a blocking circuit that prevents current from flowing from the output transistor to the column line different from the associated column line.

25. The imaging device of claim 24, wherein the blocking circuit is a Schottky diode.

26. The imaging device of claim 23, wherein each pixel comprises a plurality of photosensors that each selectively store charge at the storage region.

27. The imaging device of claim 23, wherein the output transistor is arranged to receive the operative power from the different column line.

28. The imaging device of claim 23, wherein the circuit for supplying operative power further comprises a row transistor for selectively transferring the pixel output signal from the output transistor to the associated column line.

29. The imaging device of claim 23, wherein the gate of the reset transistor is coupled to the associated column line and the reset transistor is arranged to receive power from a reset control line.

30. The imaging device of claim 23, wherein the reset transistor is arranged to receive power from the different column line.

31. The imaging device of claim 23, wherein the associated column line and the different column line are adjacent.

32. An imaging device comprising: a pixel array having a plurality of pixels arranged in rows and columns; and a plurality of column lines for receiving pixel output signals from pixels in an associated column of the array, wherein a pixel of the array comprises: at least one photosensor; a storage region for storing charge generated by the at least one photosensor; a source follower transistor having a gate coupled to said storage region and arranged to receive operative power from a different column line of the plurality of column lines, the source follower transistor for providing an output signal to an associated column line of column lines, wherein the different column line is configured to receive an output signal from an output transistor in a different column; and     a reset transistor having a gate coupled to the associated column line and arranged to receive operating power from a reset select line, the reset transistor for resetting the storage region.

33. The imaging device of claim 32, wherein the pixel comprises four photosensors.

34. The imaging device of claim 32, further comprising a blocking circuit to prevent current from flowing from the source follower transistor to the different column line.

* * * * *